United States Patent [19]
Grassl et al.

[11] Patent Number: 4,717,817
[45] Date of Patent: Jan. 5, 1988

[54] CHIP CARD READER

[75] Inventors: Erwin Grassl; Hermann Hansbauer, both of Munich, Fed. Rep. of Germany

[73] Assignee: Siemens Aktiengesellschaft, Berlin & Munich, Fed. Rep. of Germany

[21] Appl. No.: 788,271

[22] Filed: Oct. 17, 1985

[30] Foreign Application Priority Data

Nov. 20, 1984 [DE] Fed. Rep. of Germany ....... 3442397

[51] Int. Cl.⁴ .............................................. G06K 7/06
[52] U.S. Cl. .................... 235/441; 235/492; 439/68
[58] Field of Search ................. 339/75 MP; 235/492, 235/441

[56] References Cited

U.S. PATENT DOCUMENTS 3,699,311 10/1972 Dunbar ........................... 235/492 X
4,169,644 10/1979 Bonhomme ................... 339/75 MP
4,449,775 5/1984 de Pommery et al. ........ 339/75 MP

FOREIGN PATENT DOCUMENTS 3343757 6/1985 Fed. Rep. of Germany .
3343727 6/1985 Fed. Rep. of Germany .

*Primary Examiner*—David L. Trafton
*Attorney, Agent, or Firm*—Jeffrey P. Morris

[57] ABSTRACT

A chip card reader is disclosed with carriages (2) mounted in a receiving part (1) for displacement counter to a spring force. A feature of the present invention is that the present chip card reader exhibits high contact forces and at the same time low card insertion forces. The carriage (2) carries contact springs (14) for the contacting of the chip as well as a device (11, 16) for turning the reading and evaluating system on and off, where the control of these two systems occurs through a slide (7) which is disposed in the carriage (2) crosswise to the direction of card introduction, and which is actuated by at least one control surface (8, 9) disposed in the receiving part.

5 Claims, 12 Drawing Figures

CHIP CARD READER

BACKGROUND OF THE INVENTION

1. Technical Field

The present invention relates to a chip card reader having a carriage mounted thereon for carrying a card to be read. The carriage runs counter to a spring force in a receiving part of the reader and has springs for contacting a chip located on the chip card. Included in the present reader is a device for turning the reading and evaluating mechanism of the reader on and off.

2. Description of the Prior Art

Arrangements are known where a chip card is at first placed into a carriage without friction or making physical contact with the card. Only after insertion of the carriage into the receiving part, approximately in an end position, or a position for reading the chip card, is the contacting thereof accomplished. This contacting occurs through a crosspiece arranged at the receiving part of the reader, which crosspiece presses contact springs moved with the carriage down onto the chip card approximately at this end position. The turning on and off of the reading and evaluating system occurs via a separate micro-switch.

When used frequently, the chip card reader as well as the chip card are subject to an inevitable accumulation of dirt. To ensure the safety of operation of the reader nevertheless, contact forces higher than normally might be required are needed for the contacting of the chip card. In the case of equipment of relatively low weight, e.g. light-weight telephone equipment, this results in the equipment being displaced by the spring forces in an undesirable manner.

SUMMARY OF THE INVENTION

The object of the present invention therefore is to provide a chip card reader having high contact forces and at the same time low insertion forces.

The problems exhibited by the known arrangement are solved by the present invention in that the carriage carries the springs for the contacting of the chip as well as the device for turning the reading and evaluating system on and off, the control of these two systems being effected by a slide disposed in the carriage crosswise to the direction of card introduction, which slide is actuated by at least one control surface disposed in the receiving part.

Due to this arrangement, the contacting of the chip card is effected by two means, namely by longitudinal displacement of the carriage and by the separate longitudinal movement of the slide. Thus the effective path for control of the contact springs is increased considerably without increasing the displacement path of the carriage receiving the chip card, so that even with high contact forces, less force is required for inserting. Because the contact springs are acted upon via the two paths, they are not brought into their contact position abruptly as in known contact devices, so that the life of the chip card and contact springs is lengthened considerably. By placing the device for turning the reading and evaluating system on and off and for actuating it by the slide inside the carriage, again lower insertion forces are needed—since this device is actuated simultaneously with the contact springs—than when a separate micro-switch is present.

The device for turning the reading and evaluating system on and off may be formed by a main spring and a counter-contact, the free end of the main spring being applied against a cam of the slide, this main spring tensioning the slide in its starting position (FIG. 1). In this case the main spring supplies the force for resetting the slide to a predetermined position, thereby obviating separate spring elements for the return of the slide.

According to one embodiment of the invention, the receiving part may be U-shaped and its two legs may have control surfaces arranged offset in the direction of introduction. The overall width can thereby be minimized. At the same time, the control surfaces prevent the carriage from tilting and thus ensure its proper guidance.

Furthermore the slide may be mounted in a guideway for the carriage with ramps which cooperate with a free end of a unilaterally clamped contact spring. In their contact region, the contact springs may be essentially S-shaped and be received by channels provided in the slide. By placing the contact springs in channels, the overall height of the carriage can also be minimized.

To prevent the chip card from being pulled improperly in its reading position and from being damaged by the running of the reading and evaluating system, the main spring is associated with a rocker, one free end of which is controllable by a slope of the slide while its other free end is pressed by a helical spring in the direction of the chip card, the rocker having an arm whose free end has an inclined surface spanning the main spring. Due to this arrangement, after a short excursion of the chip card, the rocker is pivoted by the helical spring, the main spring being pushed away from the counter-contact by the inclined surface of the arm. The reading and evaluating system is thereby turned off.

With this design it is possible to use the carriage without a receiving part, as the carriage by itself constitutes a viable part. Furthermore it is conceivable to fix the slide of the carriage in the reading position and thus to realize with the same structural part an inexpensive reader without external control, with contact springs now acting as wiper contacts. In both of the last-mentioned forms of realization, the mentioned rocker, which brings about a rapid turnoff of the reading and evaluating system, preserves the functionality and hence lengthens the life of the chip card.

BRIEF DESCRIPTION OF THE DRAWINGS

In the following detailed description, the invention will be explained more specifically with reference to one particular embodiment.

DETAILED DESCRIPTION

The chip card reader illustrated in the figures consists essentially of the receiving part 1 and of the carriage 2 guided for longitudinal displacement in this receiving part 1. The carriage 2 is moved into the reading position counter to the force of two springs 3 and is held engaged in this position e.g. by means of a cardioid control. By a second pressure on the carriage 2, the latter is returned to its starting position by the springs 3.

Figure 1:
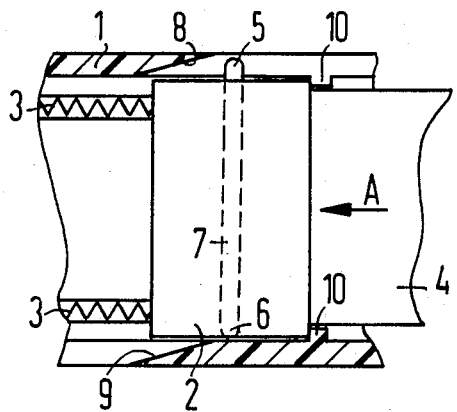
FIG. 1 shows the guidance of the carriage in the card reader, in plan.

As the chip card 4 is being introduced, the carriage is moved in arrow direction A. Inside the carriage 2 a slide 7 is arranged, whose ends 5 and 6 extend beyond the carriage and whose operation will be discussed later. This slide 7 is actuated by the control surfaces 8 and 9 of the receiving part 1. FIG. 1 illustrates the starting position of the carriage, that is, the carriage is pressed by the springs 3 against the shoulders 10 at the receiving part which form an abutment for the carriage 2. As the carriage is being inserted in the receiving part 1 in arrow direction A, the slide 7, tensioned by the force of the main spring 11, first slides along the control surface 9 and after a short travel strikes against the control surface 8, by which it is pushed into the reading position.

Figure 2:
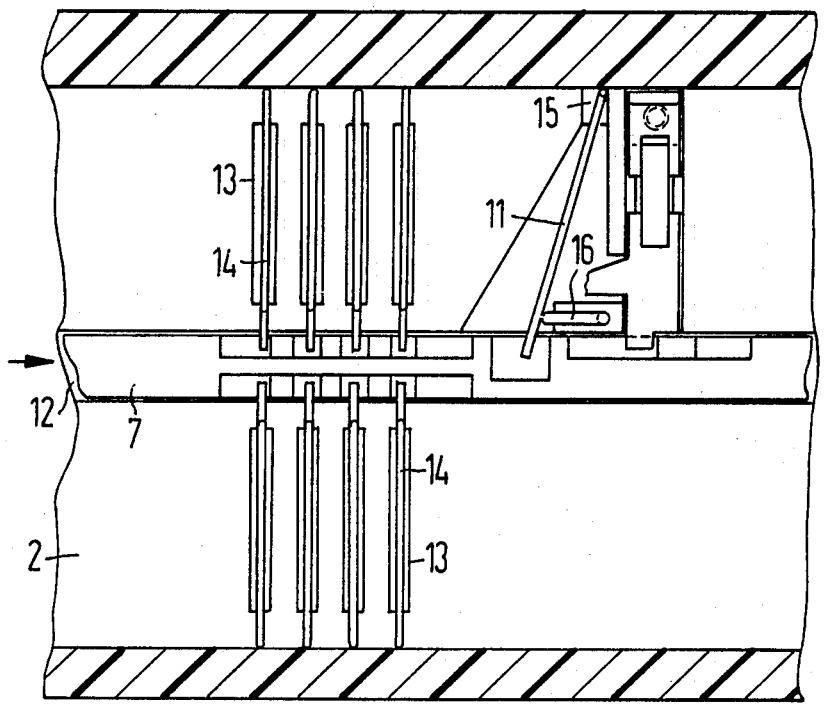
FIG. 2 is a top view onto the carriage in the reading position thereof, as seen from the reading side of chip card.

In the view illustrated in FIG. 2 onto the carriage 2 in its reading position, the slide 7 mounted in a guideway 12 of carriage 2 is visible. This slide 7 actuates for one thing the contact springs 14 disposed in channels 13 as well as the previously mentioned main spring 11 guided in a cutout 15. In the reading position of carriage 2 the main spring 11 is electrically connected with a counter-contact 16, the reading and evaluating system being thus controlled.

Figure 3:
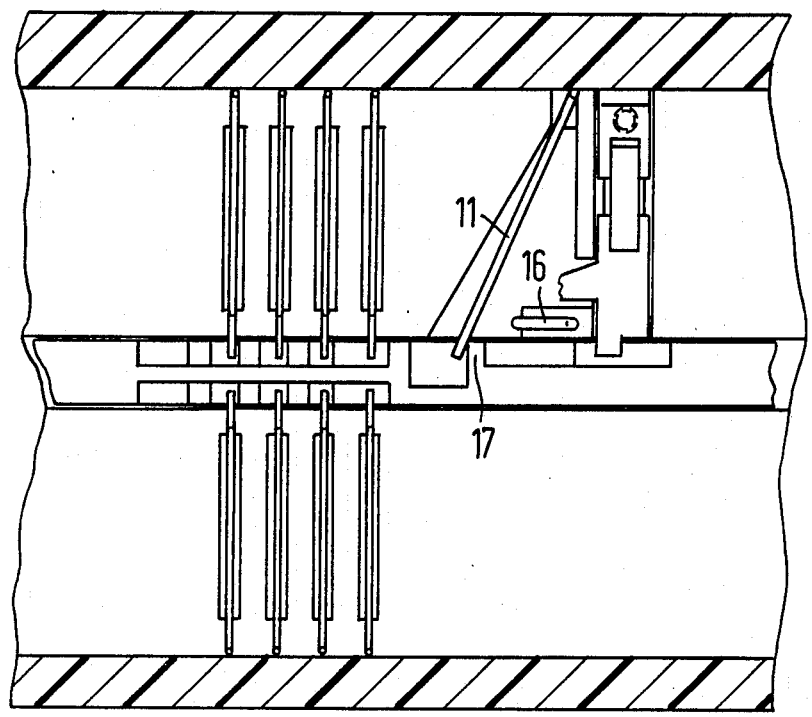
FIG. 3 is a top view onto the carriage in the starting state thereof, as seen from the reading side of the chip card.

In the top view represented in FIG. 3, the starting position of carriage 2 shown in FIG. 1 inside the receiving part 1 is illustrated, that is, by the slide the main spring 11 is removed from the counter-contact 16 by the cam 17 and is thus further tensioned.

Figure 4:
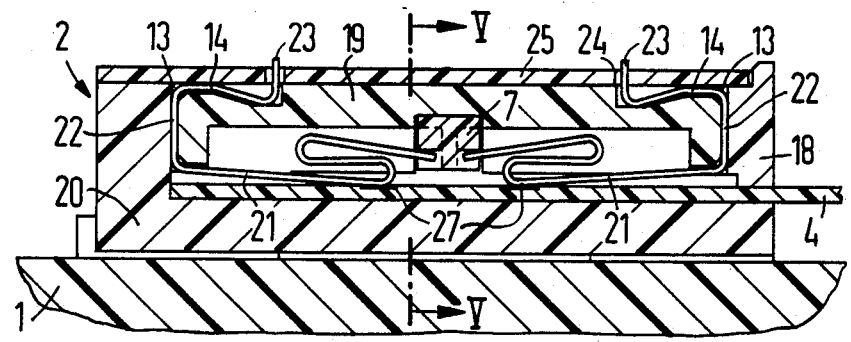
FIG. 4 is a sectioned side view of the carriage in the reading position thereof.

FIG. 4 indicates the position of the contact springs 14 in the reading position of carriage 2. It can be seen that the carriage consists essentially of a U-shaped base 20 which presents a slot 18 for introduction of the chip card 4, and of an intermediate support 19 which is arranged in the U-shaped base 20 and possesses the channels 13 for the contact springs 14. In their contact regions the contact springs 14 are S-shaped and retained freely movable, while in their attachment regions they are approximately U-shaped and clamped tight. In the attachment region 22, their free ends 23 are bent at an angle and protrude through holes 24 in a circuitboard 25.

Figure 5:
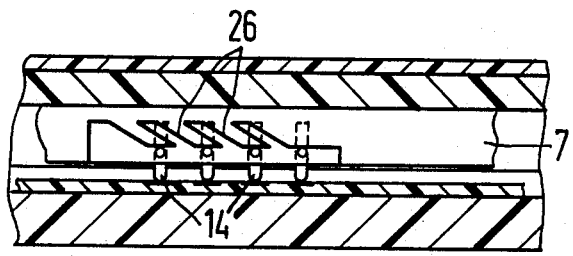
FIG. 5 shows a section through the arrangement according to FIG. 4 along line V—V.

The contact springs 14 are pushed into the reading position by the slide 7. Referring to FIG. 5, for this purpose the slide 7 has for each contact spring 14 a ramp 26 which steers the respective contact spring 14 into the position shown in FIG. 5, thus moving the contact regions 21 in the direction of the contact surfaces 27 of the chip card 4 and contacting them therewith.

Figure 6:
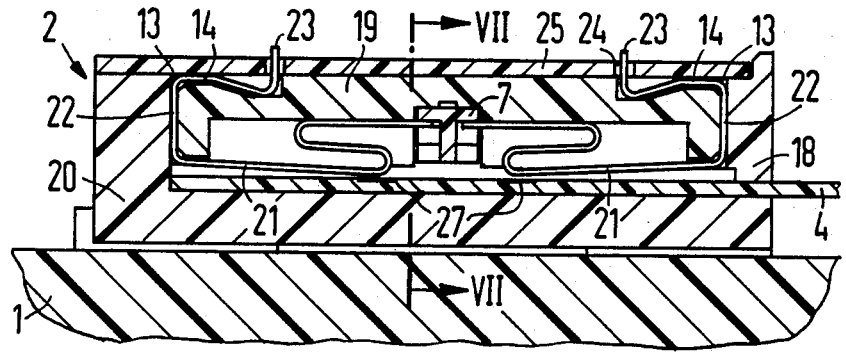
FIG. 6 is a sectioned side view of the carriage in the starting position thereof.
Figure 7:
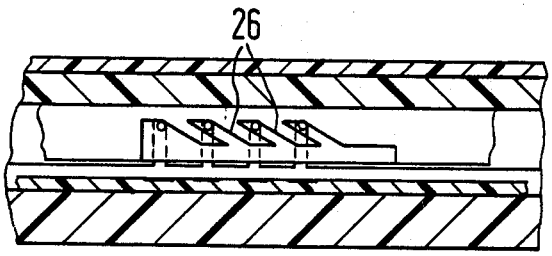
FIG. 7 shows a section through the arrangement according to FIG. 6 along line VII—VII.

FIGS. 6 and 7 show the carriage in its starting position. The chip card 4 has already been inserted into slot 18 up to an abutment. Here the chip card 4 and carriage 2 are in the position shown in FIG. 1, that is, the chip card is not contacted. As can be seen from the figures, the contact regions 21 are lifted off the contact surfaces 27 of the chip card and have not yet been actuated by the ramps 26.

Figure 8:
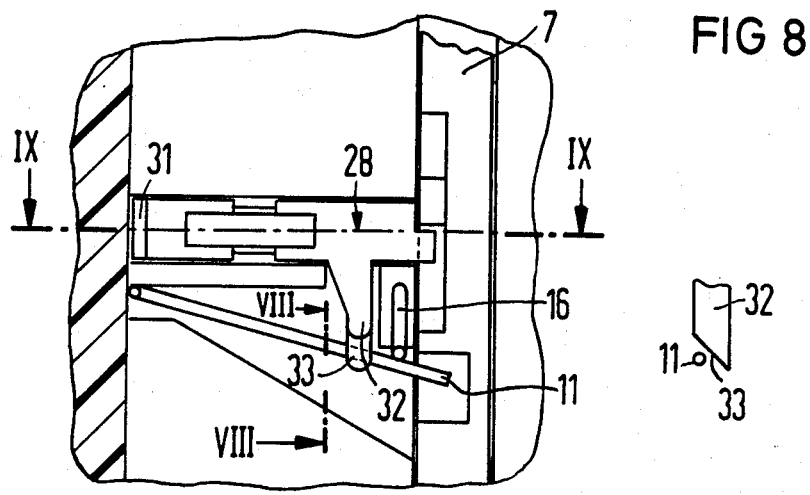
FIG. 8 shows particular detail seen from the reading side of the carriage, in the reading state.
Figure 9:
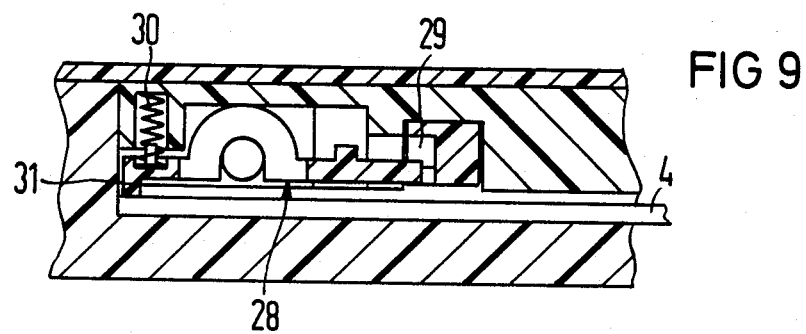
FIG. 9 shows a section through the arrangement according to FIG. 8 along line IV—IV.

As has been mentioned, the chip card 4 is contacted only in its reading position, with the main spring 11 and the counter-contact 16 lying one on the other and the reading and evaluating system being connected. Via a slope 29 on a slide 7 a rocker is pivoted counter to the force of the helical spring 30 in the starting position of the carriage (FIG. 1). As the chip card is being introduced into slot 18, the edge-piece 31 of rocker 28 is spanned by the chip card 4. Under normal insertion of the carriage with the chip card into the reading position (locked state of the carriage e.g. by a cardioid), rocker 28 remains in the position shown in FIG. 9, i.e. the main spring 11 and counter-contact 16 are closed and the reading and evaluating system is connected. In addition, rocker 28 possesses an arm 32 which protrudes into the region of the main spring 11 and whose end region 33 is formed as an inclined surface. In the representation shown in FIGS. 8 and 9, this end region remains lifted off the main spring 11. This state can be seen in the detail drawing of FIG. 8 and represents a section along line VIII—VIII.

Figure 10:
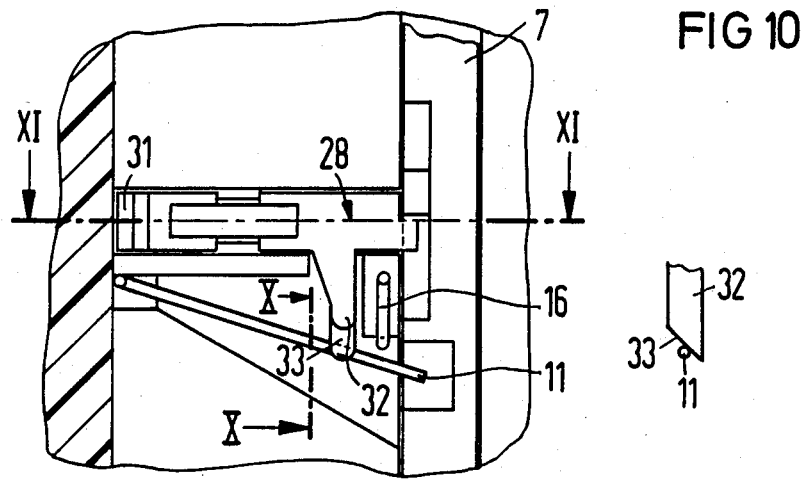
FIG. 10 shows particular detail seen from the reading side of the carriage, with the chip card pulled straight.
Figure 11:
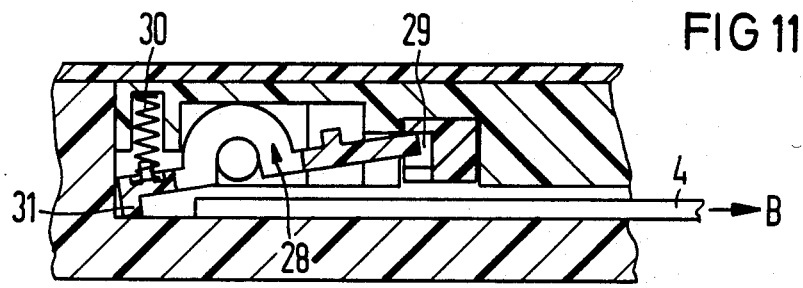
FIG. 11 shows a section through the arrangement according to FIG. 10 along line XI—XI.

If the carriage is pushed in the direction of the locking position without introduction of a chip card, the contact springs 14 are indeed actuated by slide 7, but due to the slope 29 at the slide and at the helical spring 30 the rocker is pivoted into the position shown in FIGS. 10 and 11, so that the main spring and counter-contact 16 do not come in contact with one another. This separation of the main spring from the counter-contact 16 is brought about by the mentioned inclined surface 33 of the arm 32 formed at rocker 28. This state appears in the detail drawing of FIG. 10 and constitutes a section along line X—X.

When the carriage with inserted chip card 4 is in the reading position, i.e. in the locked state of the carriage (FIGS. 2, 9), the edge-piece 31 is depressed by the chip card 4. Referring to FIG. 11, if, with the carriage locked, the chip card 4 is improperly pulled out in arrow direction B, the edge-piece 31 of rocker 28 will, after a short distance, be released by the chip card 4, whereby, due to the helical spring acting on the edge-piece 31, the arm 32 presenting the inclined surface 33 pushes this main spring 11 away from the counter-contact. During this process the slide 7 has shifted in the reading position to the extent that the end of the rocker opposite the edge-piece 31 is released. Thereby the reading and evaluating system is turned off.

Figure 12:
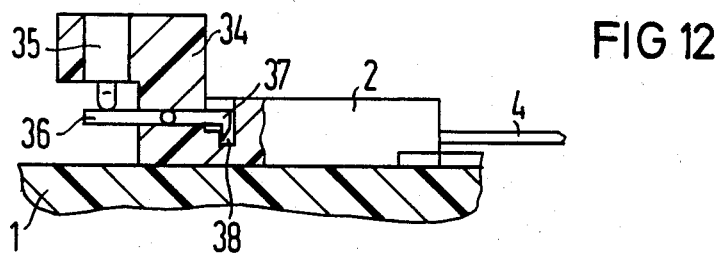
FIG. 12 shows a possibility for locking and unlocking the carriage inside the card reader.

As has been mentioned before, the locking and unlocking of the carriage inside the receiving part can be effected by means of cardioid control. FIG. 12 indicates an additional possibiltiy for locking and unlocking the carriage 2. This device consists of a lifting magnet 35 which is arranged in a mount 34 and which acts on a pivotably mounted rocking lever 36. The rocking lever 36 has an angular shoulder 37 which in the locking state engages in a depression 38 of carriage 2 matching the shape of this shoulder 37. After termination of the reading process, the rocking lever can be pivoted into the unlocking position by an appropriate electrical pulse, the carriage 2 being thereby released.

For certain applications it may be desirable furthermore to equip the chip card reader without a locking and unlocking system. This is desirable especially in those cases in which merely data are to be read which can be polled by brief insertion of the carriage.

What is claimed is:

1. A chip card reader with a carriage mounted in a receiving part for displacement counter to a spring force, and having springs for contacting a chip located on the card, including a device for turning the reading and evaluating system on and off, wherein the carriage carries the springs for the contacting of the chip and the device for turning the reading and evaluating system on and off, wherein the control of chip contact and card reading is effected by a slide means disposed in the carriage crosswise to the direction of card introduction, which slide means is actuated by at least one control surface disposed in the receiving part, and wherein the device for turning the reading and evaluating system on and off is comprised by a main spring and a countercontact the free end of the main spring being applied against a cam of the slide and the slide being tensioned in its starting position by said main spring.

2. The chip card reader according to claim 1, wherein the receiving part is U-shaped and both legs present control surfaces disposed offset in the direction of introduction.

3. The chip card reader according to claim 1, wherein the slide is mounted in a guideway of the carriage and presents ramps which cooperate with a free end of a contact spring clamped unilaterally.

4. The chip card reader according to claim 3, wherein in their contact region, the contact springs are essentially S-shaped and, in their attachment regions, are received by channels provided in the slide.

5. The chip card reader according to claim 1, wherein the main spring is associated with a rocker, one free end of which is controllable by a slope of the slide while the other free end of said rocker is pressed by a helical spring in the direction of the chip card, said rocker having an arm whose free end comprises an inclined surface spanning said main spring.

* * * * *